March 4, 1952 J. B. DAVIS, JR 2,587,701
LIQUID FUEL METER
Filed Nov. 22, 1948
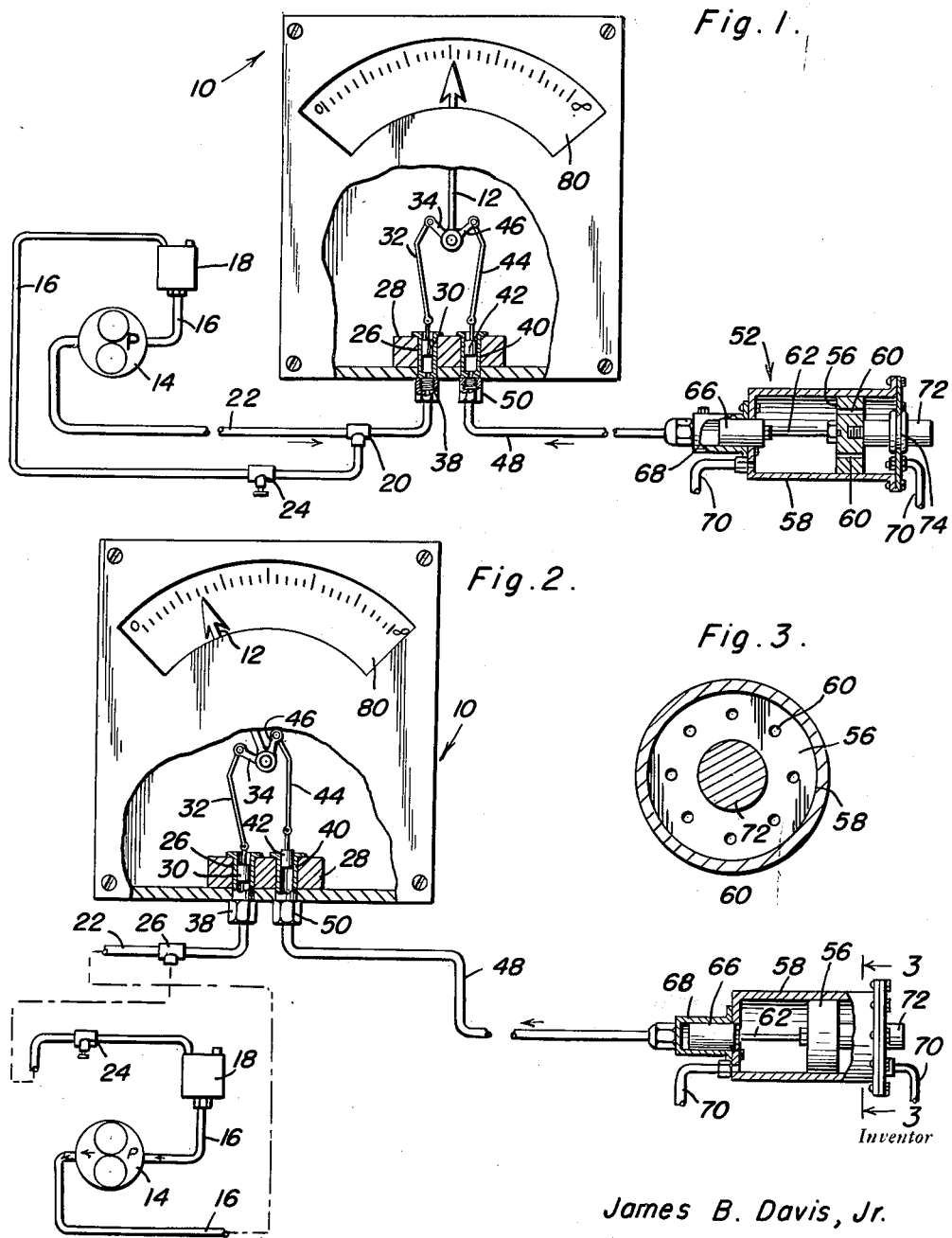
Inventor
James B. Davis, Jr.

Patented Mar. 4, 1952 2,587,701

UNITED STATES PATENT OFFICE 2,587,701

LIQUID FUEL METER

James B. Davis, Jr., Rockville, Md.

Application November 22, 1948, Serial No. 61,448

2 Claims. (Cl. 73—114)

1

This invention relates to novel and useful improvements in attachments for motor vehicles, boats and prime movers in any environment.

An object of this invention is to balance a pressure exerted by a constant volume pump which is actuated by a speed indicator component of a vehicle, with a differential pressure derived from the rate of fuel flow, whereby economy may be indicated for visual note.

Another object of this invention is to displace a member in accordance with the differential of fuel pressure from a fuel pump, the said differential being effected by the fuel flowing through at least one calibrated orifice in a piston or diaphragm, the piston or diaphragm being disposed in a cylinder or other suitable housing, then transmitting this differential pressure to a piston or diaphragm which actuates a link, the said link tending to urge a hand or other suitable indicator in one direction, to urge the hand in the other direction by means of a force which is exerted by means of a pressure output of a pump, which pump is actuated in accordance with the speed of the vehicle. Accordingly, the two pressures tending to balance each other indicate the economy of the prime mover whether it be an engine or the like.

A feature of the present invention is the utility of an adjustable restriction in the return line for the constant volume output pump, whereby the volumetric output although directly proportional to the speed of the vehicle has an additional force set up in the return thereof, which force may be regulated to compensate for various types of engines.

A still further object of this invention is to supply a practical device for indicating the efficiency of operation of an engine of a vehicle which may be attached to existing vehicles or incorporated in the manufacture of new vehicles.

Ancillary objects and features of novelty will become apparent to those skilled in the art, in following the description of the preferred form of the invention, illustrated in the accompanying drawings, wherein:

Figure 1 is a partial elevational and partial sectional view of the preferred form of the device, certain elements being shown schematically;

Figure 2 is a view somewhat similar to that shown in Figure 1, showing a second operative position of the elements, and;

Figure 3 is a sectional view taken substantially on the line 3—3 of Figure 2 and in the direction of the arrows, illustrative of the orifices supplied in the piston.

This instrument to be described subsequently is

2 one for indicating efficiency of a prime mover of any type adaptable for the use of the device, while the same is in operation. The instant device is particularly adaptable to the common gasoline powered automotive vehicle. Accordingly, the preferred embodiment of the present device is described as being utilized in association with a vehicle.

A casing indicated at 10 generally is supplied and serves the purpose of a base in order to mount the indicator member 12 for pivotal movement. It is seen that the indicator member 12 is conventional in nature, it being within the purview of the invention to substitute other types of indicator members in lieu of the simple hand. However, the hand 12 is preferable due to its simplicity.

A constant volume pump 14 is supplied and may be of the gear type as is shown in the drawings. The gear type pump is particularly adaptable for use in conjunction with the present device since the output, both pressure and volume, is directly proportional to the rate of speed of the pump. Accordingly, the said pump 14 is adapted to be operated by a speed indicating member of a conventional vehicle. This member may be the speedometer cable, an additional cable driven from the engine transmission very similar to a conventional speedometer cable or any other suitable element. A return line 16 extends from a surge chamber 18 and terminates on the input side of the pump. This return line 16 continues to a junction 20 with the output line or conduit 22. An adjustable restriction is supplied in the return line 16. It may be in the form of an adjustable orifice 24 shown schematically in the drawings.

The utility of the adjustable orifice is to regulate each particular device for the type of vehicle on which it is to be applied. Usually, a single setting of the adjustable restriction 24 will suffice during the entire lifetime of the vehicle.

Pressure responsive means for urging the indicator member 12 in a single direction is supplied. The preferred pressure responsive means may be seen best in Figures 1 and 2 as including a cylinder 26 mounted in a bearing block 28 for convenience, and a piston 30 reciprocable in the cylinder 26. A link 32 is pivotally attached at one end to the piston rod and attached at the other end to a crank portion 34 of the indicator member 12. A suitable fitting 38 is supplied between the pump output conduit 22 and the cylinder 26.

In operation it is seen that the indicator member 12 is urged in a single direction by means of a force directly proportional to the output pressure of the pump 14. However, the pump is actuated by a speed indicating member of the vehicle and accordingly, the force applied to the indicator member 12 is a function of the speed of the vehicle. A second cylinder 40 is disposed in the bearing block 28 and has a second piston 42 slidably positioned therein. A link 44 identical to the link 32 is attached to the piston rod of the piston 42 and to the crank-like projection 46, extending from the indicator member 12. The cylinder 40, piston 42, link 44 and crank-like projection 46 cooperate to form means responsive to pressure for urging the indicator member 12 in a single direction.

A conduit 48 is attached to the cylinder 40 through the medium of a conventional coupling 50 and is used to transmit fluid under pressure to the said piston 42. The fluid under pressure under discussion at this time is urged by means of a device generally indicated 52 and which is is reality a flow meter device or a motor actuated by differential pressures reflected in rate of fuel flow.

The said flow meter consists of a piston or operating member 56 which is slidably disposed in a cylinder 58 and has at least one and preferably a plurality of calibrated orifices or passages 60 therein. A piston rod 62 is fixed to the piston 56 and has another piston 66 fixed at the end thereof. This last mentioned piston 66 is slidably disposed in a relatively smaller cylinder 68. Fluid trapped in the cylinder 68 is urged under pressure into the cylinder 40, thereby applying the desired force on the indicator member 12.

In order that the force applied to the piston 66 may be a function of the rate at which the fluid fuel utilized, a line 70 is attached to the back end of the cylinder 58. This line 70 is in reality the line extending from a conventional fuel pump to a conventional carbureter of an engine. The cylinder 58 is simply interposed in this line.

Fuel under pressure of the fuel pump enters a cylinder 58 and is passed through the number of orifices 60 supplied in the piston 56. Accordingly, a differential in pressure will be set up in the cylinder 58, one pressure being on one side of the piston 56 and the other pressure being on the other face of the said piston 56. Accordingly, due to this differential in pressure, the piston 66 will be reciprocated in accordance with variances of this differential.

A guide 72 is attached to the upstream face of the piston 56 and extends through a suitable opening in the back end of the cylinder 58 with a bushing 74 disposed therearound. It is noted from inspection of Figure 1 that the guide 72 is the same diameter as the piston 66 in order to compensate for effective areas removed from the upstream and downstream face of the piston 56.

The general operation of the invention is as follows:

Fuel enters the cylinder 58 from the fuel pump and under fuel pump pressure. Since the fuel must pass through the calibrated orifices 60 in order that it may proceed to the carbureter of the engine, there is a differential of pressure set up in the cylinder 58 and on each side of the piston 56. This motivates the piston 66, thereby applying a torque to the indicator member 12 through the intermediate structure. This torque is a function of the rate at which the fluid fuel is being utilized and hence, a function of the amount of fuel being utilized.

At the same time, the constant volume output or displacement pump 14 is operated by a speedometer element or the equivalent. Hence, the pressure output of the pump 14 is a function of the speed of the vehicle. In turn, speed being a function of distance travel, the torque set up on the indicator member 12 opposite that set up on the same indicator member by the fuel flow apparatus, tend to balance each other. If they are balanced a predetermined reading on the dial or indicator bearing plate 80 will appear. Assuming that a vehicle is not moving, yet the engine is being actuated, then the pressure output of the pump 14 will be zero, and the indicator member 12 will move to the zero position, as influenced and urged by the discussed pressure differential. As the vehicle is moved slowly forward at the same engine R. P. M. and the same engine fuel consumption, the hand or indicator member 12 will move steadily toward the infinity point marked on the indicia plate.

It is contemplated by the present invention to substitute diaphragms for one or more, or even all of the pistons disclosed and described herewith. In connection with the diaphragms, it will not be necessary to have cylinders, since it would only require the usual diaphragm housing to be associated therewith.

It is apparent that other variations may be made without departing from the spirit of the invention.

Having described the invention, what is claimed as new is:

1. A device for indicating the efficiency of a vehicle with regard to unit volume of fuel utilized per unit distance traversed comprising a pump adapted to be actuated by a vehicle speed indicator, a base having an indicator carried thereby, a conduit extending from said pump, and movable pressure responsive means operatively connected with said conduit for moving said indicator in a single direction, movable pressure responsive means for moving said indicator in the opposite direction, a conduit extending from said last mentioned means, a cylinder attached in communication with said conduit, a piston in said cylinder, a second cylinder fixed to said cylinder, a second piston fixed to said first mentioned piston and disposed in said second cylinder, at least one passage in said second piston, and means for applying fuel pump output pressure to one side of said second piston.

2. The combination of claim 1 and a return line for said first mentioned pump with an adjustable restriction therein.

JAMES B. DAVIS, Jr.

REFERENCES CITED

The following references are of record in the file of this patent:

UNITED STATES PATENTS

| Number | Name | Date |
|---|---|---|
| 1,699,163 | Schiske | Jan. 15, 1929 |
| 1,747,536 | Aernout | Feb. 18, 1930 |
| 1,770,257 | Stephenson et al. | July 8, 1930 |
| 2,268,549 | Kennedy | Jan. 6, 1942 |

FOREIGN PATENTS

| Number | Country | Date |
|---|---|---|
| 199,492 | Great Britain | June 28, 1923 |
| 554,722 | Great Britain | July 16, 1943 |